(12) United States Patent
Jammu (10) Patent No.: US 6,681,215 B2
(45) Date of Patent: Jan. 20, 2004

(54) LEARNING METHOD AND APPARATUS FOR A CAUSAL NETWORK

(75) Inventor: Vinay Bhaskar Jammu, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 277 days.

(21) Appl. No.: 09/681,336

(22) Filed: Mar. 20, 2001

(65) Prior Publication Data

US 2003/0018600 A1 Jan. 23, 2003

(51) Int. Cl.$^7$ .............................................. G06F 15/18
(52) U.S. Cl. .......................................... 706/21; 706/16
(58) Field of Search ..................................... 706/21, 16

(56) References Cited

U.S. PATENT DOCUMENTS 5,802,256 A  9/1998  Heckerman et al. .......... 706/59
5,845,272 A  12/1998  Morjaria et al. .............. 706/50
6,353,679 B1 * 3/2002  Cham et al. ................. 382/228

* cited by examiner

Primary Examiner—George B. Davis
(74) Attorney, Agent, or Firm—Ann M. Agosti; Patrick K. Patnode (57) ABSTRACT

A system and method for improving a causal network is provided. A new apriori probability is determined for a repair or a configuration factor within the causal network and compared to an old apriori probability. If the new apriori probability differs from the old apriori probability by more than a predetermined amount, the causal network is updated. Further, in another aspect, a causal network result is stored for a causal network, wherein the causal network includes a plurality of root causes with a symptom being associated with each of said root causes. An existing link probability is related to the symptom and root cause. An expert result or an actual data result related to each of the symptoms is stored. A new link probability is computed based on the stored causal network result, and expert result or the actual data result.

18 Claims, 6 Drawing Sheets

LEARNING METHOD AND APPARATUS FOR A CAUSAL NETWORK

BACKGROUND OF THE INVENTION

The present invention relates to a learning method and apparatus for improving causal networks, and particularly to a learning method and apparatus for Bayesian belief networks.

Complex electromechanical systems such as locomotives are composed of several complex sub-systems. Each of these sub-systems is built from components that may fail over time. When a component does fail, it is difficult to identify the failed component. This is because the effects or problems that the failure has on the sub-system are often neither obvious in terms of their source nor unique. The ability to automatically diagnose problems that have occurred or will occur in the locomotive sub-systems has a positive impact on minimizing down-time of the electromechanical systems.

Computer-based systems are used to automatically diagnose problems in a locomotive in order to overcome some of the disadvantages associated with completely relying on experienced personnel. Typically, a computer-based system utilizes a mapping between the observed symptoms of the failures and the equipment problems using techniques such as a table look-up, a symptom-problem matrix, and production rules. These techniques work well for simplified systems having simple mapping between symptoms and problems. However, complex equipment and process diagnostics seldom have simple correspondences between the symptoms and the problems. In addition, not all symptoms are necessarily present if a problem has occurred, thus making other approaches more cumbersome.

Morjaria et al. U.S. Pat. No. 5,845,272 teaches a system and method for isolating failures in a locomotive. A locomotive comprising several complex sub-systems is detailed. A method and system is set forth for isolating causes of failure, generally including supplying incident information occurring in each of the several sub-systems during operation of the locomotive; mapping some of the incidents to indicators, wherein each indicator is representative of an observable symptom detected in a sub-system; determining causes for any failures associated with the incidents with a fault isolator; wherein the fault isolator comprises a diagnostic knowledge base having diagnostic information about failures occurring in each of the plurality of sub-systems and the indicators, and a diagnostic engine for processing the mapped indicators with the diagnostic information in the diagnostic knowledge base; and providing a course of action to be performed for correcting the failures.

A particularly useful tool for determining probabilities of certain isolated failures in a locomotive is a causal network, as detailed in Morjaria et al. One type of a causal network is a Bayesian Belief Network (BBN). BBNs are conventionally used to determine the conditional probability of the occurrence of a given event. For a detailed description of BBNs, reference is made to certain useful texts, including Neopolitan, Richard E., *Probabilistic Reasoning in Expert Systems*, pp. 251–316, John Wiley and Sons, 1990.

The ability to automatically improve the performance of a BBN is important for improving its performance and eliminating the time-consuming and complicated task of physically modifying the BBN. In application to locomotive fault diagnosis, present BBNs do not have the ability to automatically improve their performance, or learn, when they make errors in diagnosis. To improve their performance, an expert usually examines the current BBN, and makes modifications to it based on his/her expertise and the type of misdiagnoses produced by the BBN. This task is time-consuming and involved, and does not provide the ability to adapt the BBNs performance based on the locomotive"s operational characteristics.

There is a need to improve the performance of a BBN so as minimize or eliminate the time consuming and complicated task of physically modifying the BBN.

SUMMARY OF THE INVENTION

There is provided a system and method for improving a causal network. A new apriori probability is determined for a repair or a configuration factor within the causal network. The new apriori probability is compared to an old apriori probability for the repair or the configuration factor. If the new apriori probability differs from the old apriori probability by more than a predetermined amount, the causal network is updated.

In another aspect, a causal network result is stored for a causal network. The causal network includes a plurality of root causes with a symptom being associated with each of the root causes. The causal network further includes an existing link probability related to the symptom and root cause. An expert result or an actual data result related to each of the symptoms is stored. A new link probability is computed based on the stored causal network result, and expert result or the actual data result.

These and other features and advantages of the present invention will be apparent from the following brief description of the drawings, detailed description, and appended claims and drawings.

BRIEF DESCRIPTION OF THE DRAWINGS

The invention will be further described in connection with the accompanying drawings, which are meant to be exemplary not limiting, in which.

DETAILED DESCRIPTION

As discussed, BBNs are used in fault diagnosis systems in major assemblies such as locomotives. However, it is understood that alternative electrical, mechanical, or electromechanical systems may be the subject of the fault diagnosis systems described herein. For example, common systems that may employ the fault diagnosis systems include, but are not limited to, gas or steam turbine systems; aviation systems such as engines, electrical components, and mechanical components; generator or motor systems; substation systems and components such as circuit breakers, gear boxes, transformers, switchboards, switchgear, meters, relays, etc.; medical equipment such as tomography (CT) scanners, X-ray equipment, magnetic resonance imaging (MR)

systems, nuclear medicine cameras, ultrasound systems, patient monitoring devices, and mammography systems; appliances such as refrigerators, ovens, air conditioning units, etc.; manufacturing equipment such as material processing systems, conveyor systems, control systems, etc.; and other conventional electrical, mechanical, or electro-mechanical systems.

Figure 1:
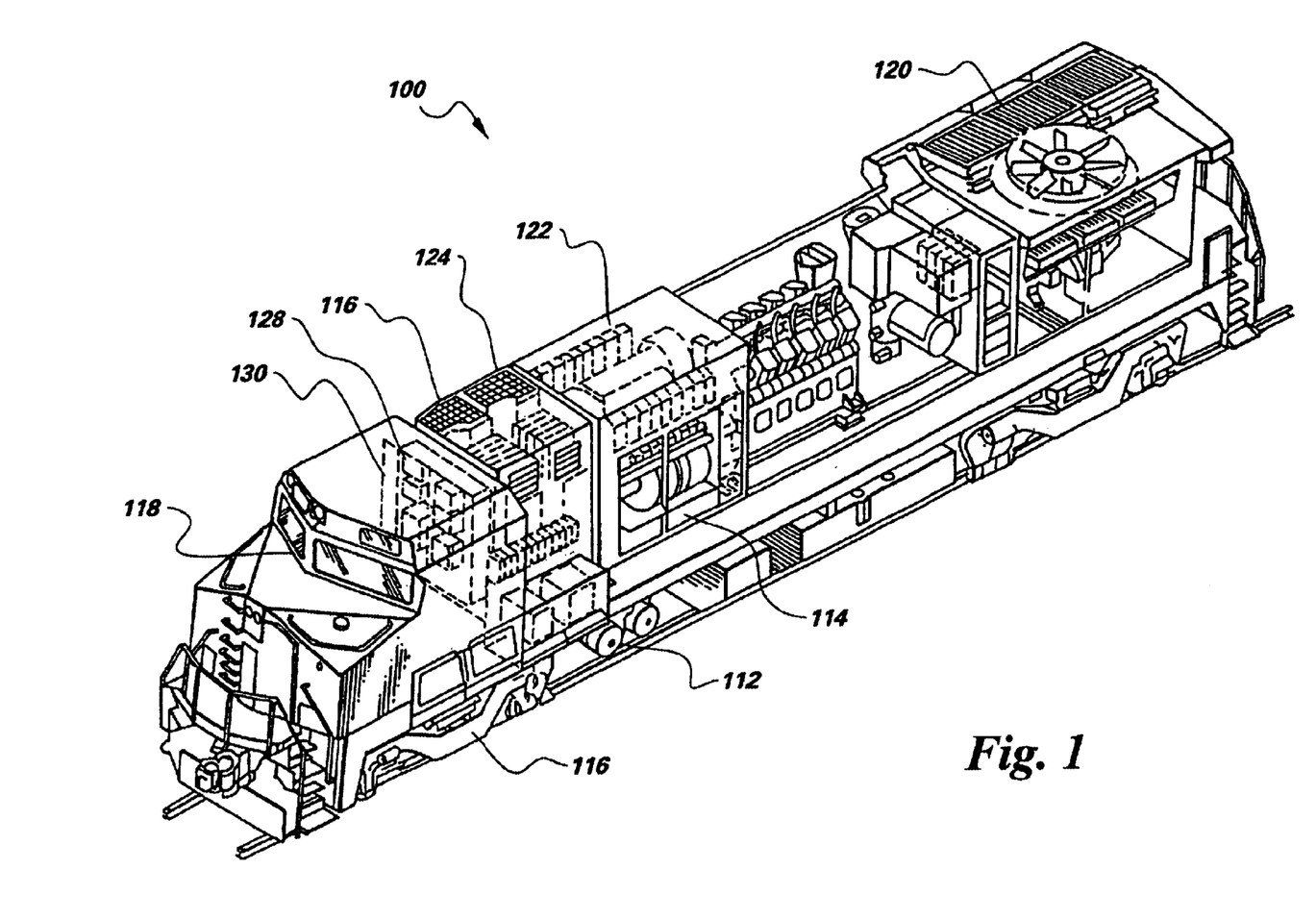
FIG. 1 shows a schematic of a locomotive.

An algorithm is presented for automatically updating data used in the BBN. Updating a locomotive BBN is one exemplary application of the invention. FIG. 1 shows a schematic of a locomotive 100. The locomotive may be either an AC or DC locomotive. Locomotive 100 is comprised of several complex sub-systems, each performing separate functions. Some of the sub-systems and their functions are listed below. Note that locomotive 100 includes many other sub-systems and that the present invention is not limited to the sub-systems disclosed herein.

An air and air brake sub-system 112 provides compressed air to the locomotive, which uses the compressed air to actuate the air brakes on the locomotive and cars behind it.

An auxiliary alternator subsystem 114 powers all auxiliary equipment. In particular, it supplies power directly to an auxiliary blower motor and an exhauster motor. Other equipment in the locomotive is powered through a cycle skipper.

A battery and cranker sub-system 116 provides voltage to maintain the battery at an optimum charge and supplies power for operation of a DC bus and a HVAC system.

An intra-consist communications sub-system collects, distributes, and displays consist data across all locomotives in the consist.

A cab signal sub-system 118 links the wayside to the train control system. In particular, system 118 receives coded signals from the rails through track receivers located on the front and rear of the locomotive. The information received is used to inform the locomotive operator of the speed limit and operating mode.

A distributed power control sub-system provides remote control capability of multiple locomotive consists anywhere in the train. It also provides for control of tractive power in motoring and raking, as well as air brake control.

An engine cooling sub-system 120 provides the means by which the engine and other components transfer heat to the cooling water. In addition, it minimizes engine thermal cycling by maintaining an optimal engine temperature throughout the load range and prevents overheating in tunnels.

An end of train sub-system provides communication between the locomotive cab and the last car via a radio link for the purpose of emergency braking.

An equipment ventilation sub-system 122 provides the means to cool the locomotive equipment.

An event recorder sub-system records Federal Railroad Administration required data and limited defined data for operator evaluation and accident investigation. It can store up to 72 hours of data.

A fuel monitoring sub-system provides means for monitoring the fuel level and relaying the information to the crew.

A global positioning sub-system uses Navigation Satellite Timing and Ranging (NAVSTAR) signals to provide accurate position, velocity and altitude measurements to the control system. In addition, it also provides a precise Universal Time Coordinated (UTC) reference to the control system.

A mobile communications package sub-system provides the main data link between the locomotive and the wayside via a 900 MHz radio.

A propulsion sub-system 124 provides the means to move the locomotive. It also includes the traction motors and dynamic braking capability. In particular, the propulsion sub-system 124 receives power from the traction alternator and through the traction motors, converts it to locomotive movement.

A shared resources sub-system includes the I/O communication devices, which are shared by multiple sub-systems.

A speed sensor sub-system provides data generally from propulsion sub-system 124 to the shared resources sub-system.

A traction alternator sub-system 126 converts mechanical power to electrical power which is then provided to the propulsion system.

A vehicle control system sub-system reads operator inputs and determines the locomotive operating modes.

The above-mentioned sub-systems are monitored by a locomotive control system 128 located in the locomotive. Locomotive control system 128 keeps track of any incidents occurring in the sub-systems with an incident log. An on-board diagnostics sub-system 130 receives the incident information supplied from the control system and maps some of the recorded incidents to indicators. The indicators are representative of observable symptoms detected in the sub-systems. On-board diagnostic sub-system 130 then determines a list of the most likely causes for any locomotive failures, as well as provides a list of corrective actions to take to correct the failures. In addition, the on-board diagnostics system can request that certain manual indicators located about the sub-system be checked, and based on the status of the manual indicators, refines the diagnosis to provide better results.

Figure 2:
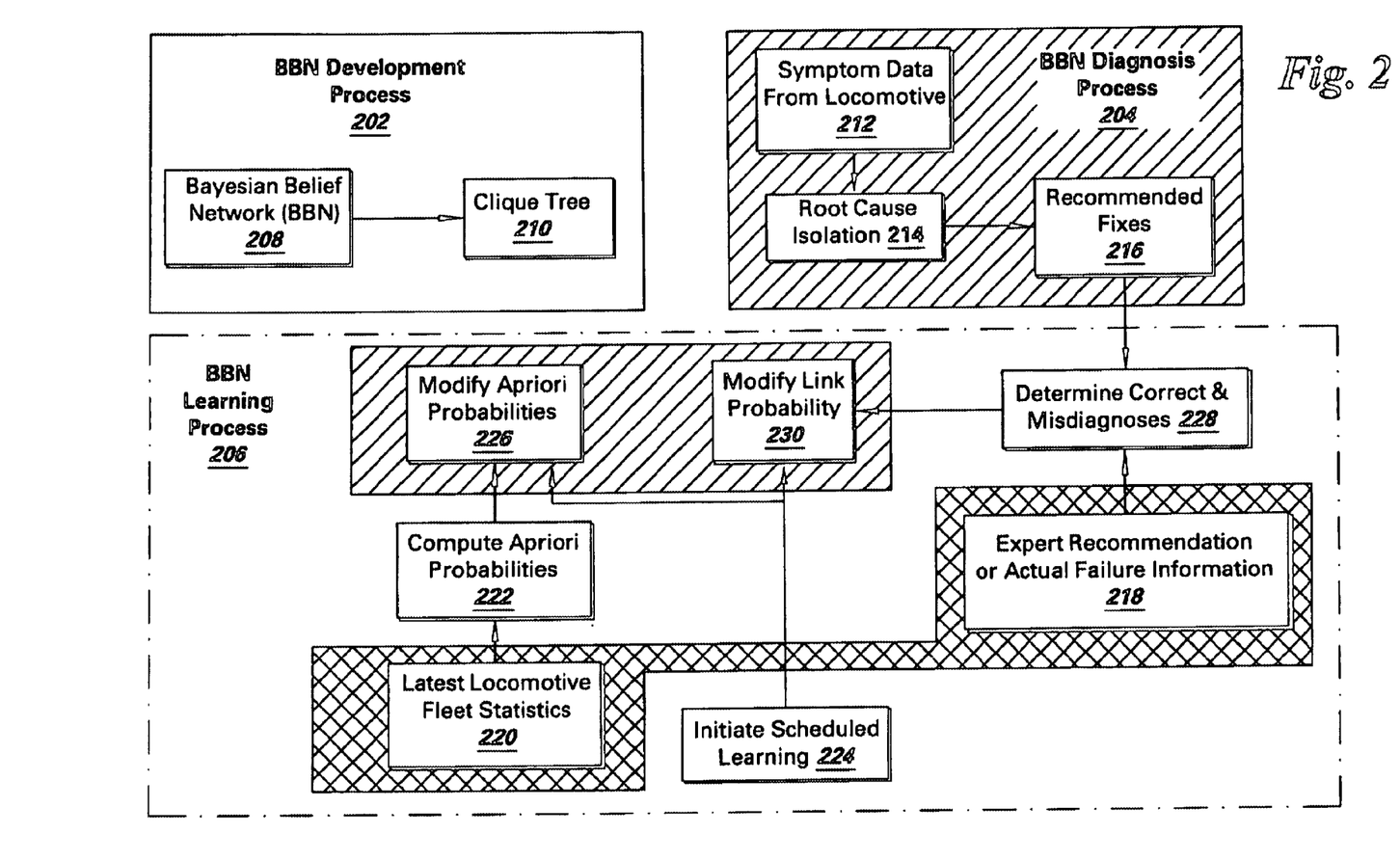
FIG. 2 illustrates a learning process in an exemplary embodiment of the invention.

FIG. 2 illustrates an overview of a process 200 generally for developing a BBN, diagnosing with a BBN, and updating a BBN. Process 200 includes a BBN development process 202, a BBN diagnosis process 204, and a BBN learning process 206.

BBN development process 202 generally represents the initial creation of a BBN 208 and an associated clique tree 210 for use with locomotives. BBN 208 functions generally as is conventionally known, with exemplary aspects more specifically described further herein. Clique tree 210 is essentially a BBN optimized for performing diagnosis quickly. BBN diagnosis process 204 generally represents procurement of symptom data from a locomotive 212 and the root cause isolation 214 from such symptom data 212. Further, in one exemplary embodiment, BBN recommended fixes 216 are presented. The BBN diagnosis process is generally performed when new symptom data is available from one or more locomotives or other new data sources (e.g., a control system such as locomotive control system 128, or a user).

BBN learning process 206 generally represents the updating of information and the modification of clique tree 210. Information is updated based on various sources. These sources generally provide repairs such as root causes and failure modes, or configuration factors such as new or updated statistical data. For example, new data may refer to new electro-mechanical, electronic, software, or other components, and updated data may refer to existing components having statistical information updated because of repairs in the particular system, another system, theoretical observations, experimental purposes, other updates or any combination comprising at least one of the foregoing updates. In the example of BBN learning process 206, the updates may comprise past recommendations by an expert or actual failure information 218; past recommended fixes 216; and updated locomotive fleet statistics 220. Apriori probability information associated with the updated locomotive fleet statistics is computed at 222.

Apriori probability information refers to the failure rates at which locomotive components fail independent of any observed fault indications. These rates tend to change over time as the locomotives age or as design improvements are made. These rates for various locomotives are automatically computed by fleet, by design, or by road number either at scheduled intervals of time (i.e., daily, weekly, monthly, etc.) or whenever sufficient information is available (which is user defined).

When a scheduled learning 224 is initiated, which can be at scheduled intervals of time (i.e., daily, weekly, monthly, etc.) or whenever sufficient information is available (which is user defined), apriori probabilities within clique tree 210 are updated with the latest data at 226.

The recommended fixes 216 and expert or actual failure information 218, are compared at 228 to the observed faults in the locomotive to determine whether the BBN and/or expert were correct or not. When scheduled learning 224 is initiated, all or some errors in diagnosis are generally used to modify the link probability at 230 between two nodes in BBN 208 as compiled in clique tree 210.

Figure 3:
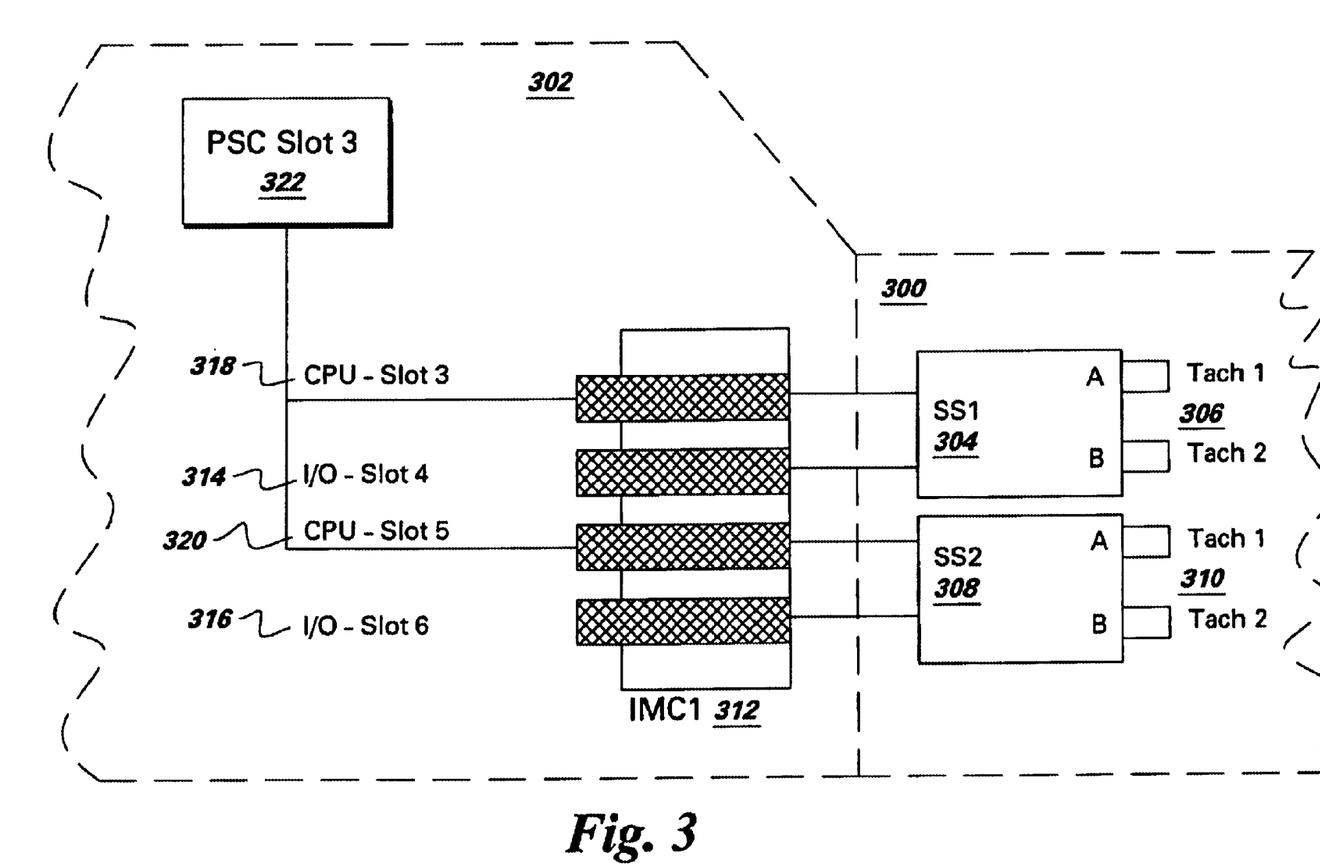
FIG. 3 illustrates a schematic of a portion of a speed sensor sub-system within a locomotive.

FIG. 3 is a schematic of a portion of a speed sensor sub-system 300 within a locomotive. Sub-system 300 is integrated generally with a propulsion sub-system (not shown) such as propulsion sub-system 124 described above with respect to FIG. 1 through a shared resources sub-system and a control sub-system (both of which are generally indicated as sub-system 302). Particularly, a speed sensor 304, referred to as SS1 304, is integrated with one portion of a propulsion sub-system and a speed sensor 308, referred to as SS2 308, is integrated with another portion of a propulsion sub-system. Each portion of the propulsion sub-system is further integrated with a set of tachometers 306, referred to as Tach1 306 and Tach2 306 (providing tachometer information to SS1 304) and with a set of tachometers 310, referred to as Tach1 310 and Tach2 310 (providing tachometer information to SS2 308).

SS1 304 and SS2 308 interact with sub-system 302 via a lower level control 312 (identified as Inverter Motor Controller or IMC 312). Lower level control 312 comprises input/output (I/O) cards 314 and 316 and central processing unit (CPU) cards 318 and 320. I/O cards 314 and 316 receive data from and provide data to speed sensors 304 and 308, respectively. CPU cards 318 and 320 receive data from and provide data to I/O cards 314 and 316, respectively. A higher level control sub-system 322 (identified as PSC Slot 3, representative of a portion of a Propulsion System Controller) provides control and a processing platform for lower level control 312.

Figure 4:
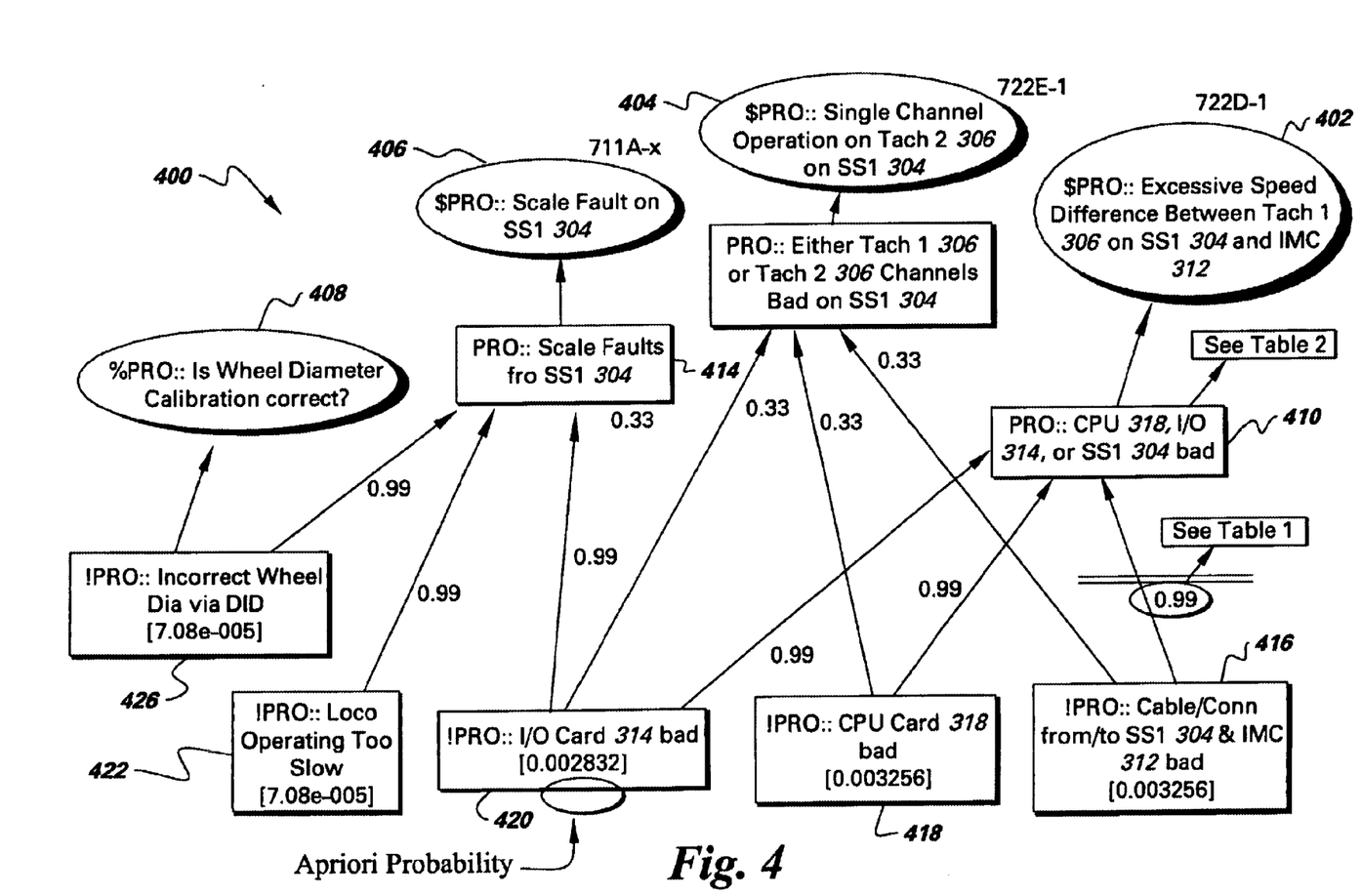
FIG. 4 illustrates a partial speed sensor Bayesian Belief Network.

FIG. 4 illustrates a partial BBN 400 used for speed sensor diagnosis comprising a plurality of symptoms, mediating causes, and root causes interconnected via links. In the exemplary embodiment of FIG. 4, a partial speed sensor BBN is presented; however, it will be understood that other BBNs can employ the various embodiments herein for automatically updating probability (link and node) data.

In the partial speed sensor BBN 400, a plurality of symptoms 402, 404, 406, 408 are representative of various possible faults. As detailed in FIG. 4, symptom 402 is a variable indicating existence of an excessive speed difference between Tach 1 306, SS1 304, and an inverter motor controller (IMC) that is associated with the portion of the propulsion sub-system integrated with SS1 304. Symptom 404 is a variable indicating single channel operation in Tach 2 306 to SS1 304. Symptom 406 is a variable indicating whether a scale fault exists on SS1 304. Symptom 408 is a variable indicating incorrect wheel diameter calibration.

A plurality of mediating causes 410, 412, and 414 included in BBN 400 are linked to certain symptoms. Mediating cause 410 represents a variable indicating a fault at CPU 318, I/O 314, or SS1 304, and is linked to symptom 402. Mediating cause 412 represents a variable indicating a fault in channels for Tach1 306 and/or Tach2 306 on SS1 304, and is linked to symptom 404. Mediating cause 414 represents a variable indicating a scale fault for SS1 304, and is linked to symptom 406.

A plurality of root causes 416, 418, 420, 422 and 424 are linked to certain mediating causes or symptoms. Root cause 416 represents a variable indicating a fault at the cable or connector between SS1 304 and IMC 312, and is linked to the variables represented in mediating causes 410 and 412. Root cause 418 represents a variable indicating a fault in CPU 318, and is linked to the variables represented in mediating causes 410 and 412. Root cause 420 represents a variable indicating a fault in I/O 314, and is linked to the variable represented in mediating causes 410, 412, and 414. Root cause 422 represents a variable indicating that the locomotive is operating to slow, and is linked to the variable represented in mediating cause 414. Root cause 424 represents a variable indicating incorrect wheel diameter via Diagnostic Information Display (DID), and is linked to the variable represented in mediating cause 414 and symptom 408.

Each root cause 416, 418, 420, 422 and 424 has a probability attached to it. In one embodiment, the probability is expressed as an apriori probability. The failure rates at which the components fail, independent of any observed fault indications, is quantitatively expressed. For example root cause 418 has an apriori probability of a root cause of failure of 0.28321%. Each root cause has an apriori probability or frequency of occurrence of the listed problem.

Between the root causes 416, 418, 420, 422 and 424 and the mediating causes 410, 412 and 414, certain links exist as detailed above and in FIG. 4. Each link has an associated link probability. For example the link between root cause 420 and mediating cause 414 has a link probability of 99% attached to it, generally representing the statement that if a bad I/O 314 exists, the probability that scale faults for SS1 304 will result is 99%. Other links have link probabilities as shown.

In certain exemplary embodiments, the underlying data regarding the link probabilities are derived from probability tables indicating the probabilities associated with certain input node states and output node states between particular root causes and mediating causes. For example, Table 1 indicates the link probability between root cause 416 (a fault in the cable or connector between SS1 304 and IMC 312) and mediating cause 410 (a fault in CPU 318, I/O 314, or SS1 304), is illustrated in Table 1.

TABLE 1

| Link Probability | | |
|---|---|---|
| Cable or connector between SS1 304 and IMC 312 bad | CPU 318, I/O 314, or SS1 304 bad (Output Node State) | |
| (Input Node State) | TRUE | FALSE |
| TRUE | 0.99 | 0.01 |
| FALSE | 0 | 1 |

Table 1 expresses the probability of CPU 318, I/O 314, or SS1 304 bad (mediating cause 410) given root cause 416

(Cable or connector between SS1 304 and IMC 312 bad). The probability of CPU 318, I/O 314, or SS1 304 bad is true given Cable or connector between SS1 304 and IMC 312 bad is true is 99%, and the probability of CPU 318, I/O 314, or SS1 304 bad is true given Cable or connector between SS1 304 and IMC 312 bad is false is 0%.

Each of the link probabilities between root causes and mediating causes has a similar link probability table. These link probabilities are exemplary and the invention within a locomotive system is not limited to these specific probabilities. Additionally other systems using the techniques of the preferred embodiment have similar probability tables.

In addition to the link probabilities, there is a node probability and a node probability table associated with each node. The node probability tables list possible permutations of the mediating cause and the associated root causes. Table 2 illustrates a Node Probability Table for mediating cause 510.

[t6]

TABLE 2

Node Probability

|   | !PRO:: Cable/Conn from/to SS1 304 & IMC 312 bad | !PRO:: CPU Card 318 bad | !PRO:: I/O Card 314 bad | PRO:: CPU, I/O, or SS1 bad (Output Node State) | |
|---|---|---|---|---|---|
|   |   |   |   | TRUE | FALSE |
| 1 | FALSE | FALSE | FALSE | 0 | 1 |
| 2 | TRUE | FALSE | FALSE | 1 | 0 |
| 3 | FALSE | TRUE | FALSE | 1 | 0 |
| 4 | FALSE | FALSE | TRUE | 1 | 0 |
| 5 | TRUE | TRUE | FALSE | 1 | 0 |
| 6 | FALSE | TRUE | TRUE | 1 | 0 |
| 7 | TRUE | FALSE | TRUE | 1 | 0 |
| 8 | TRUE | TRUE | TRUE | 1 | 0 |

The first three columns of Table 2 represent the states of three inputs to the mediating cause 410. These inputs include root cause 416 (Cable or Connector from/to SS1 304 and IMC 312 Bad), root cause 418 (CPU Card 318 Bad), and root cause 520 (I/O Card 314 Bad). The last two columns represent the TRUE or FALSE node probability conditions of the CPU 318, I/O 314 or SS1 304 Bad node. As can be seen, the first row represents a condition whereby all of the root causes are false. The node probability is such that with all three inputs being false, there is a 0 probability the node will indicate a TRUE. Additionally there is a 1.0 probability that the node will indicate FALSE under these conditions. Rows 2–7 have one or more of values that is TRUE. In these cases the Output Node state has a 1.0 probability of being TRUE and a 0 probability of being FALSE. Row 8 has all inputs TRUE state that will create a 1.0 probability that the Output state of the node will be TRUE and a 0 probability of being FALSE.

Figure 5:
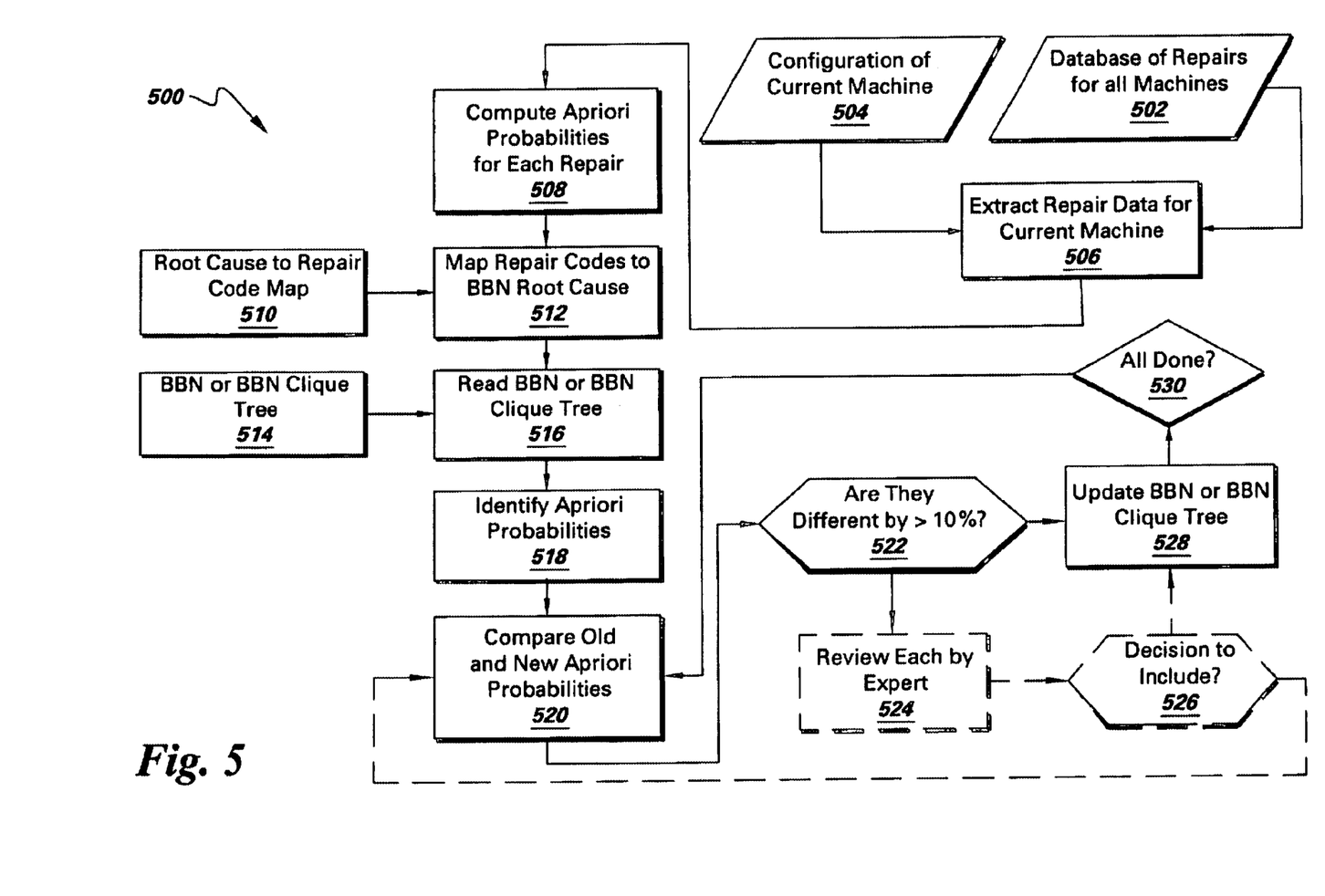
FIG. 5 illustrates an algorithm for modifying apriori probabilities.

Referring now to FIG. 5, an algorithm 500 for modifying apriori probabilities is presented. Algorithm 500 modifies apriori probabilities within a BBN based on sources including a database 502 having historical repairs data generally for all locomotives on the BBN. Also, the configuration 504 of the locomotives on the BBN is provided. For example, database 502 may comprise repair items, repair codes, frequencies of repairs of each item, and associated probabilities. Alternatively, new configuration factors may be included, for example, related to updated information regarding new equipment, software, or other new data. Table 3 is a portion of an exemplary database 502 concerned with repair information:

[t3]

TABLE 3

REPAIR CODES AND FREQUENCY OF OCCURRENCE

| Repair Code | Repair Item | Frequency of Occurrence of Repair | Probability of Repair |
|---|---|---|---|
| 2706 | SS_X - Traction Motor Speed Sensor, X = # | 1766 | 0.11634495 |
| 1224 | PM_XYZ - Phase Module, X = Inv#, Y = Pha#, Z = Pol | 483 | 0.031820278 |
| 1221 | GD_XYZ - Gate Driver, X = Inv#, Y = Phs#, Z = Pol | 480 | 0.031622637 |
| 2794 | TGSS - True Ground Speed Sensor | 320 | 0.021081758 |
| 5400 | TM_X - AC Traction Motor General, X = # | 281 | 0.018512418 |
| 5401 | Cable, Traction Motor Cable or Connector | 273 | 0.017985375 |
| 1711 | BATT - Battery (Locomotive Batteries) | 169 | 0.011133803 |
| 1223 | LPS - Logic Power Supply | 76 | 0.005006917 |
| 4460 | Wheels - Truck | 73 | 0.004809276 |
| 1115 | IMC_X - Inverter Motor Controller X = 1,2,3 | 73 | 0.004809276 |
| 1222 | GDPC_X-(PSAC) Gate Driver Power Converter | 57 | 0.003755188 |
| 1118 | CAX - CAB/EXC Panel (EXC eliminated) | 55 | 0.003623427 |
| 1700 | Electrical Components - General | 52 | 0.003425786 |
| 5150 | Bolts, TM - General | 48 | 0.003162264 |
| 2851 | Wiring - General | 45 | 0.002964622 |
| 1104 | EXC - Excitation Controller Panel | 44 | 0.002898742 |
| 1116 | PSC - Propulsion System Controller | 43 | 0.002832861 |
| 2590 | CM_XY - Current Meas. Mod (LEM)X = Inv Y = Ph | 37 | 0.002437578 |
| 9204 | Software, IFC | 31 | 0.002042295 |
| 2501 | BRG_XY - Braking Resistor Grid, X = Stk, Y = R | 30 | 0.001976415 |
| 1610 | Fuses - General | 29 | 0.001910534 |
| 1501 | CMV, CM - Air Compressor Magnet Valve | 25 | 0.001647012 |
| 1770 | Cab Signal - General | 21 | 0.00138349 |
| 1850 | DBG - Dynamic Braking Grid Box - General | 19 | 0.001251729 |

From this data repair information data (and configuration factors) for the current machine is extracted at 506. The next step is to compute apriori probabilities for each repair at 508. A map 510 associated with algorithm 500 maps root causes to repair codes (or appropriate codes associated with the configuration factors) at a mapping step 512 where repair codes are mapped to root causes determined by the BBN. A portion of an exemplary map 510 of BBN root causes and corresponding repair codes are provided in Table 4.

[t4]

TABLE 4

BBN ROOT CAUSE REPAIR CODES

| BBN Root Cause | Repair Code |
|---|---|
| !PRO::Control_BreakerOpen_ | 1220 |
| !PRO::Generator_FieldBreakerOpen_ | 1220 |

TABLE 4-continued

BBN ROOT CAUSE REPAIR CODES

| BBN Root Cause | Repair Code |
|---|---|
| !VCS::BJ+GFCircuit__BreakerOpenor__Tripped__ | 1220 |
| !PRO::EBISpotter__CircuitOpen__ | 1501 |
| !PRO::FSCV1__CoilOpen__ | 1513 |
| !PRO::FSCV1__StuckClosed__ | 1513 |
| !PRO::FSCV1Coil__Shortedor__Supression__DeviceShorted__ | 1513 |
| !PRO::FSCV2__CoilOpen__ | 1513 |
| !PRO::FSCV2__StuckClosed__ | 1513 |
| !PRO::FSCV2Coil__Shortedor__Supression__DeviceShorted__ | 1513 |
| !PRO::RSCV1__CoilOpen__ | 1517 |
| !PRO::RSCV1__StuckClosed__ | 1517 |
| !PRO::RSCV1Coil__ShortedorSupression__DeviceShorted__ | 1517 |
| !PRO::RSCV2__CoilOpen__ | 1517 |
| !PRO::RSCV2__StuckClosed__ | 1517 |
| !PRO::RSCV2Coil__ShortedorSupression__DeviceShorted__ | 1517 |
| !PRO::BJ-__CoilOpen__ | 1604 |
| !PRO::BJ-__CoilOpen__ | 1604 |
| !PRO::BJ-__Mechanical__Failure__ | 1604 |
| !PRO::BJ-__PositionSensor__StuckClosed__ | 1604 |

Additionally, the BBN or BBN clique tree 514 is read at 516. From this new apriori probabilities are identified a 518 and compared with the old apriori probabilities at 520. A decision is made at 522 to whether the new apriori probabilities and the old apriori probabilities are different by a predetermined value. If the difference is less than 10%, for example, then the BBN or BBN clique tree is updated automatically at 528. In one exemplary embodiment, the BBN or BBN clique tree is updated at 528 with a mapper module. In another exemplary embodiment, the mapper module performs modification to probability information in the BBN such that it avoids the need for recompiling the BBN. It uses the BBN in compiled format (clique trees), and updates the probability values in the clique tree by incorporating the apriori probability values into the correct nodes into the clique tree.

In an optional loop step (indicated by dashed lines), if the difference between new apriori probabilities and old apriori probabilities is greater than the 10% (or other selected percentage if 10% was not selected) a review of each value is optionally made by an expert at 524 and an expert decides at 526 whether not to include the new apriori probabilities and updates the BBN or BBN clique tree at 528. If the new apriori probabilities are not included, the next new apriori probability (if any exist) is compared at 520, decided at 522 and reviewed at 524.

After each update, an all done query is made at 530, and if affirmative, algorithm 500 is finished. If not, the next new apriori probabilities (if any exist) are compared at 520, decided at 522 and reviewed at 524 until all the apriori probabilities have been evaluated.

When new information is identified, e.g., generally within BBN learning process 206 as described above with respect to FIG. 2, correct and misdiagnosed faults are identified to determine which BBN sub-modules are responsible for misdiagnoses. Once these sub-modules are identified, the algorithm then performs any or all of the following three operations on the connections: (1) modify the existing probabilities on a connection so as to reduce misdiagnoses; (2) remove a connection by making probabilities on it equal to zero; and (3) add a connection and assign standard OR probabilities to it.

Figure 6:
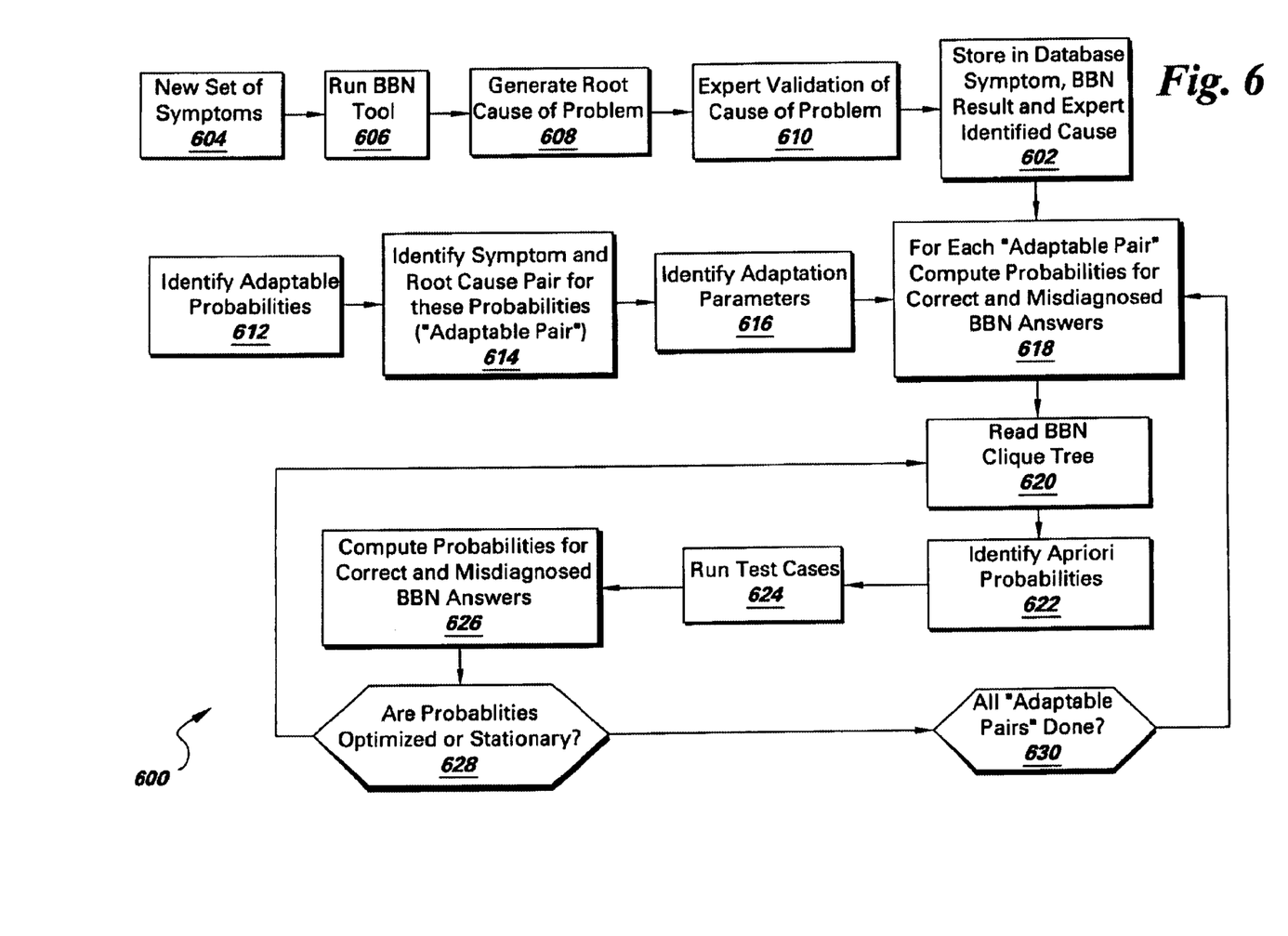
FIG. 6 illustrates a flow chart for an algorithm for modifying node probabilities.

Referring now to FIG. 6, an algorithm 600 for modifying link probabilities is presented. Data is stored at 602 in a database, including data related to symptoms, BBN resultant root causes from the associated symptom, and expert identified root causes for the symptom. When a new set of symptoms is included at 604, the BBN tool is run at 606. The BBN tool generates a root cause of the problem at 608. The BBN determined root cause is validated by an expert at 610.

Another aspect of algorithm 600 is concerned with adaptable pairs, which refer to pairs of symptoms and associated root causes that may be adapted generally to improve performance of the BBN. More particularly, adaptation refers to changing probability values with respect to existing probability values, in light of new symptoms, expert review and/or validation, new system statistics, or other updated or revised information. Adaptable probabilities, which are probability values that may be adapted, are identified at 612, and their adaptable pairs are identified at 614. Adaptation parameters are also identified at 616 for the adaptable pairs, which generally refer to parameters including, but not limited to, the current probability of the root cause occurring for a given symptom, the desired results, identification information, and the desired rate at which adaptation should be effectuated.

For each adaptable pair, probabilities are computed at 618 for correct and misdiagnosed BBN answers (e.g., as determined generally at block 228 described above with reference to FIG. 2). The BBN clique tree (e.g., clique tree 210 described above with reference to FIG. 2) is read at 620 which is in turn used for a series of computational steps including 622, 624, 626, 628 and 630.

The data read from the BBN clique tree is used to adapt the BBN probabilities at 622 in light of the adaptable parameters. The new probabilities are then used to run a self-test at 624. These test cases are used to compute probabilities at 626 for correct and misdiagnosed BBN answers. A decision is made at 628 as to whether the probabilities are within a particular degree of tolerance, or more particularly whether the probabilities are optimized or stationary. If the probabilities are optimized, then the misdiagnosis rates are minimized and the correct answers from the BBN are maximized. If the probabilities are stationary, then any more adaptation does not change the probabilities significantly even though the misdiagnosis may not have been minimized. When the probabilities are optimized or stationary, a determination is made at 630 as to whether all adaptable pairs (generally as identified at 614) have been computed at 618. The learning process is iteratively continued until the number of correct diagnoses is maximized and misdiagnoses minimized. After making these modifications to the connections, the BBN then runs the self-test at 624 using test data to ensure that improvements are made in its performance.

For example, Table 5 shows a portion of an exemplary BBN learning definition table:

[t5]

TABLE 5

BBN Learning Definition Table

| | Adaptable Pair | | Adaptable Parameters | | | |
|---|---|---|---|---|---|---|
| | | | Probability of Root | | | |
| Group | Symptom | Root Cause | Cause Occuring For Given Symptom (Current) | Desired Result After Learning (Target) | Modify Probability Table | Learning Rate |
| 1 | $PRO:: Single Channel Operation on Tach 2 306 | !PRO:: I/O Card 314 bad | 0.5 | 1 | Table 23 | 0.2 |
| 1 | $PRO:: Single Channel Operation on Tach 2 306 | !PRO:: CPU Card 318 bad | 0.25 | 0 | Table 24 | 0.2 |
| 1 | $PRO:: Single Channel Operation on Tach 2 306 | !PRO:: Cable/Conn from/to SSI 304 & IMC 312 bad | 0.25 | 0 | Table 24 | 0.2 |

The first column indicates a grouping for categorizing pairs. For example, pairs may be categorized by grouping multiple root causes associated with a symptom as shown in Table 5. The second and third columns show the adaptable pairs, each comprising a symptom and a root cause. The remaining columns include the adaptable parameters, including the adaptable pair probabilities (e.g., generally identified at steps 612 and 614 above), target result probabilities, identification information (in the form of an exemplary reference to the table in which the probability to be modified resides), and a learning rate, which represents the rate at which the probabilities are adapted.

Using the data from a BBN learning definition table such as Table 5, the new adapted BBN probability can be determined (e.g., at step 622 in algorithm 600) for the particular link. In one embodiment, the new adapted BBN probability is determined by the following formula:New Probability= Old Probability+Learning Rate (Target Current)(1). This new probability is used to adapt BBN probabilities, generally by modifying the appropriate probability table (e.g., in the sixth column of Table 5), and is used for the computational steps including 624, 626, 628 and 630, generally as described above.

In an exemplary embodiment, fidelity rules are layered within algorithms 500 and 600 to ensure that certain link and node probabilities are dependable during the learning process. One exemplary fidelity rule requires that the sum of each probability row is equal to 1. In a further exemplary embodiment, items in the BBN definition table that conflict with fidelity rules are ignored.

The present invention can be embodied in the form of computer-implemented processes and apparatuses for practicing those processes. The present invention can also be embodied in the form of computer program code containing instructions, embodied intangible media, such as floppy diskettes, CD-ROMs, hard drives, or any other computer-readable storage medium, wherein, when the computer program code loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

When the implementation is on a general-purpose microprocessor, the computer program code segments configure the microprocessor to create specific logic circuits.

While the invention has been described with reference to preferred embodiments, it will understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for this invention, but that the invention will include all embodiments falling within the scope of the appended claims.

What is claimed is:

1. A learning method for a causal network comprising:

determining a new apriori probability for one of a repair and a configuration factor within said causal network;

comparing said new apriori probability to an old apriori probability for one of said repair and said configuration factor; and updating said causal network using a learning process if said new apriori probability differs from said old apriori probability by more than a predetermined amount.

2. The learning method of claim 1, wherein the repair comprises one of a root cause and a failure mode.

3. The learning method of claim 1, wherein the causal network is a Bayesian belief network.

4. The learning method of claim 1, wherein the causal network is embodied in a program storage device readable by a machine of a locomotive, wherein the method further comprises obtaining locomotive data, and wherein determining the new apriori probability comprises using the locomotive data.

5. The learning method of claim 1, wherein the method comprises obtaining data from an electrical system, mechanical system, or electro-mechanical system, and wherein determining the new auriori probability comprises using the data.

6. The learning method of claim 1, further comprising repeating computation of said new apriori probability until the number of correct diagnoses is maximized and misdiagnoses minimized.

7. The learning method of claim 1, wherein said updating further comprises updating said causal network automatically if said new apriori probability differs from said old apriori probability by less 10%, and, if said new apriori probability differs from said old apriori probability by more 10%, obtaining expert review and updating said causal network based on the expert review 8. A learning method for a causal network comprising:
storing a causal network result for a causal network comprising a plurality of root causes with a symptom being associated with each of said root causes, said causal network further comprising an existing link probability related to the symptom and root cause;
storing one of an expert result and an actual data result related to each of said symptoms;
computing a new link probability based on said stored causal network result, and one of said expert result and said actual data result; and using said new link probability and a learning process to update the performance of said causal network.

9. The learning method of claim 8, further comprising repeating computation of said new link probability until the number of correct diagnoses is maximized and misdiagnoses minimized.

10. The learning method of claim 8, wherein said new link probability is computed by adding said existing link probability to a difference between a target probability and said existing link probability multiplied by a learning rate.

11. The learning method of claim 8, further comprising identifying a plurality of adaptable pairs each comprising an associated symptom and root cause to be adapted; and computing new link probability for each of said adaptable pairs.

12. A earning method for a causal network comprising:
determining a new apriori probability for one of a repair and a configuration factor within said causal network;
comparing said new apriori probability to an old apriori probability for one of said repair and said configuration factor;
updating said causal network using a learning process if said new apriori probability differs from said old apriori probability by more than a predetermined amount;
storing a causal network result for a causal network comprising a plurality of root causes with a symptom being associated with each of said root causes, said causal network further comprising an existing link probability related to the symptom and root cause;
storing one of an expert result and an actual data result related to each of said symptoms; and
computing a new link probability based on said stored causal network result, and one of said expert result and said act data result.

13. A program storage device readable by a machine, tangibly embodying a program of instructions executable by the machine to perform a method for improving a causal network, said method comprising:
determining a new apriori probability for one of a repair and a configuration factor within said causal network;
comparing said new apriori probability to an old apriori probability for one of said repair and said configuration factor; and
updating said causal network using a learning process if said new apriori probability differs front said old apriori probability by more than a predetermined amount.

14. A program storage device readable by a machine, tangibly embodying a program of instructions executable by the machine to perform a method for improving a causal network, said method comprising:
storing a causal network result for a causal network comprising a plurality of root causes with a symptom being associated with each of said root causes, said causal network further comprising an existing link probability related to the symptom and root cause;
scoring one of an expert result and an actual data result related to each of said symptoms; and
computing a new link probability based on said stored causal network result, and one of said expert result and said actual data result; and
using said new link probability and a learning process to update the performance of said causal network.

15. A program storage device readable by a machine, tangibly embodying a program of instructions executable by the machine to perform a method for improving a causal network, said method comprising:
determining a new apriori probability for one of a repair and a configuration factor within said causal network;
comparing said new apriori probability to an old apriori probability for one of said repair and said configuration factor;
updating said causal network using a learning process if said new apriori probability differs from said old apriori probability by more than a predetermined amount;
scoring a causal network result for a causal network comprising a plurality of root causes with a symptom being associated with each of said root causes, said causal network further comprising an existing link probability related to the symptom and root cause;
storing one of an expert result and an actual data result related to each of said symptoms; and
computing a new link probability based on said stored causal network result, and one of said expert result and said actual data result.

16. A computer program product comprising:
a computer usable medium having computer readable program code means embodied in said medium for improving a casusal network, said computer usable medium including:
computer readable first program code means for determining a new apriori probability for one of a repair and a configuration factor within said causal network;
computer readable second program code means for comparing said new apriori probability to an old apriori probability for one of said repair and said configuration factor; and
computer readable third program code means for updating said causal network using a learning process if said new apriori probability differs from said old apriori probability by more than a predetermined amount.

17. A computer program product comprising:
a computer usable medium having computer readable program code means embodied in said medium for improving a causal network, said computer usable medium including:
computer readable program code means for storing a causal network result for a causal network comprising a plurality of root causes with a symptom being associated with each of said root causes, said causal network further comprising an existing link probability related to the symptom and root cause;

computer readable second program code means for storing one of an expert result and an actual data result related to each of said symptoms; and computer readable third program code means for computing a new link probability based on said stored causal network result and one of said expert result and said actual data result and using said new link probability and a learning process to update the performance of said causal network.

18. A fault diagnosis method for a system comprising an electrical system, a mechanical system, or an electro-mechanical system, the fault diagnosis method comprising:

using system data for determining a new apriori probability for one of a repair and a configuration factor within a causal network;

comparing said new apriori probability to an old apriori probability for one of said repair and said configuration factor; and updating said causal network using a learning process if said new apriori probability differs from said old apriori probability by more than a predetermined amount; and using said causal network to diagnose faults in said system.

* * * * *